US005966872A

United States Patent [19]

Wasek et al.

[11] Patent Number: 5,966,872

[45] Date of Patent: Oct. 19, 1999

[54] VEHICLE DOOR GLASS LIFTPLATE ASSEMBLY WITH FRANGIBLE SLEEVE

[75] Inventors: Gregory A. Wasek, Sterling Heights, Mich.; Kenneth W. Steinback, Bradford, Canada

[73] Assignee: Chrysler Corporation, Auburn Hills, Mich.

[21] Appl. No.: 08/908,912

[22] Filed: Aug. 8, 1997

[51] Int. Cl.[6] .................................. B60J 1/16; B60J 1/17

[52] U.S. Cl. ................................ 49/375; 49/374; 49/348

[58] Field of Search ............................ 49/375, 374, 348, 49/349; 411/546, 5, 2, 3; 403/2

[56] References Cited

U.S. PATENT DOCUMENTS

| | | | |
|---|---|---|---|
| 3,591,982 | 7/1971 | Nantau | 49/375 X |
| 4,069,731 | 1/1978 | Stang | 411/40 |
| 4,427,326 | 1/1984 | Hobson et al. | 411/5 |
| 4,442,633 | 4/1984 | Gianotti | 49/375 |
| 4,475,314 | 10/1984 | Faix et al. | 49/374 |
| 4,658,546 | 4/1987 | Moriyama | 49/374 X |
| 4,729,703 | 3/1988 | Sato | 411/5 |
| 4,848,032 | 7/1989 | Ballor et al. | 49/350 |
| 4,970,827 | 11/1990 | Djordjevic . | |
| 5,048,232 | 9/1991 | Miyagawa et al. | 49/374 X |
| 5,363,595 | 11/1994 | Wirsing | 49/375 |
| 5,502,926 | 4/1996 | Grace et al. | 49/375 |
| 5,537,783 | 7/1996 | Kazino et al. | 49/375 |
| 5,546,704 | 8/1996 | Maruoka | 49/375 |
| 5,622,005 | 4/1997 | Ochenski et al. | 49/375 |
| 5,647,171 | 7/1997 | Wirsing et al. | 49/375 X |
| 5,729,930 | 3/1998 | Schust et al. | 49/375 |
| 5,778,599 | 7/1998 | Saito | 49/375 |

*Primary Examiner*—Daniel P. Stodola
*Assistant Examiner*—Gregory J. Strimbu
*Attorney, Agent, or Firm*—William J. Coughlin

[57] ABSTRACT

A liftplate for use in a window mounting assembly includes a first plate member, a second plate member and a third plate member. The first plate member has two spaced apart apertures and is secured to a window regulator. The apertures in the first plate member each have a sleeve molded therein. Each sleeve is attached to the first plate member through a frangible connection which is broken upon insertion of a fastener in an associated one of the apertures of the first plate member. The second plate member has an aperture which receives one of the fasteners. The third plate member has an aperture which receives the other of the fasteners. The second and third plate members are disposed opposite the first plate member and are joined to the first plate member to define a channel for receiving a sheet of window glass.

14 Claims, 4 Drawing Sheets

VEHICLE DOOR GLASS LIFTPLATE ASSEMBLY WITH FRANGIBLE SLEEVE

BACKGROUND OF THE INVENTION

1. Field of the Invention

The present invention relates generally to door glass sheet mountings for vehicles, and more particularly, to an improved mounting arrangement for attaching the glass sheet to a liftplate movable within a car door.

2. Discussion

Examples of vehicle glass movement arrangements are addressed in U.S. Pat. No. 4,848,032 (Ballor et al.) and U.S. Pat. No. 5,502,926 (Grace et al.), incorporated by reference herein. FIG. 3 illustrates one example of a prior art embodiment. A liftplate A secures a glass sheet B in place using a fastener C, and a retention nut D with a retainer E disposed therebetween. The retainer E is an additional part in the assembly. It is an object of the present invention to improve vehicle glass mounting assemblies, and particularly to reduce assembly installation procedures and to further reduce costs of such assemblies by the elimination of certain separate parts, such as the retainer E.

SUMMARY OF THE INVENTION

The present invention is directed to a vehicle window assembly, including an assembly for regulating the movement of a window within an automotive vehicle door, a liftplate for mounting on the regulator and for securing a glass sheet window for translation of the window upon actuation of the window regulator. The liftplate has a first plate member, and at least one opposing second plate member spaced apart from the first plate member. The first and second plate members are connected to form a glass receiving groove. An insulated fastener assembly secures the glass to the liftplate, thereby reducing the number of parts.

BRIEF DESCRIPTION OF THE DRAWINGS

Other features and advantages of the invention, will be evident from the following detailed description of the preferred embodiment of the invention and the accompany drawings wherein:

FIG. 7 is a sectional view taken on the line 7—7 of FIG. 5.

DETAILED DESCRIPTION OF THE PREFERRED EMBODIMENT

Figure 1:
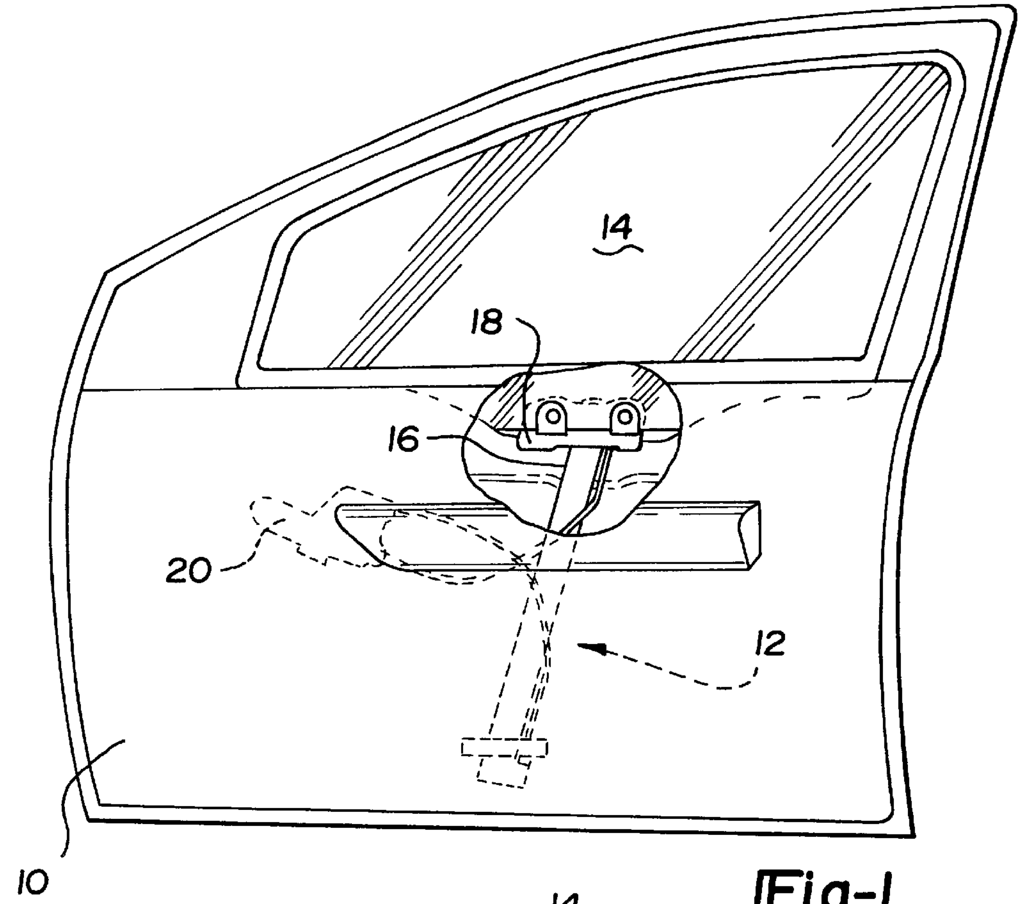
FIG. 1 is a fragmentary elevational view of a vehicle door, cut away to illustrate an assembly of the present invention.

Referring now to FIG. 1 of the drawings, there is shown a portion of the inner frame of a motor vehicle door 10 having a window regulator cable drive assembly 12 mounted on the inner door panel operative to open and close a sheet of window glass 14. An example, without limitation, of a window regulator cable drive assembly is shown and described in U.S. Pat. No. 5,502,926 (Grace et al.), incorporated by reference herein. The window glass regulator assembly includes a regulator rail 16 attached to a liftplate 18. The regulator rail is translatable generally upwardly or downwardly by a cable of a cable drive assembly 20, as known in the art.

Figure 2:
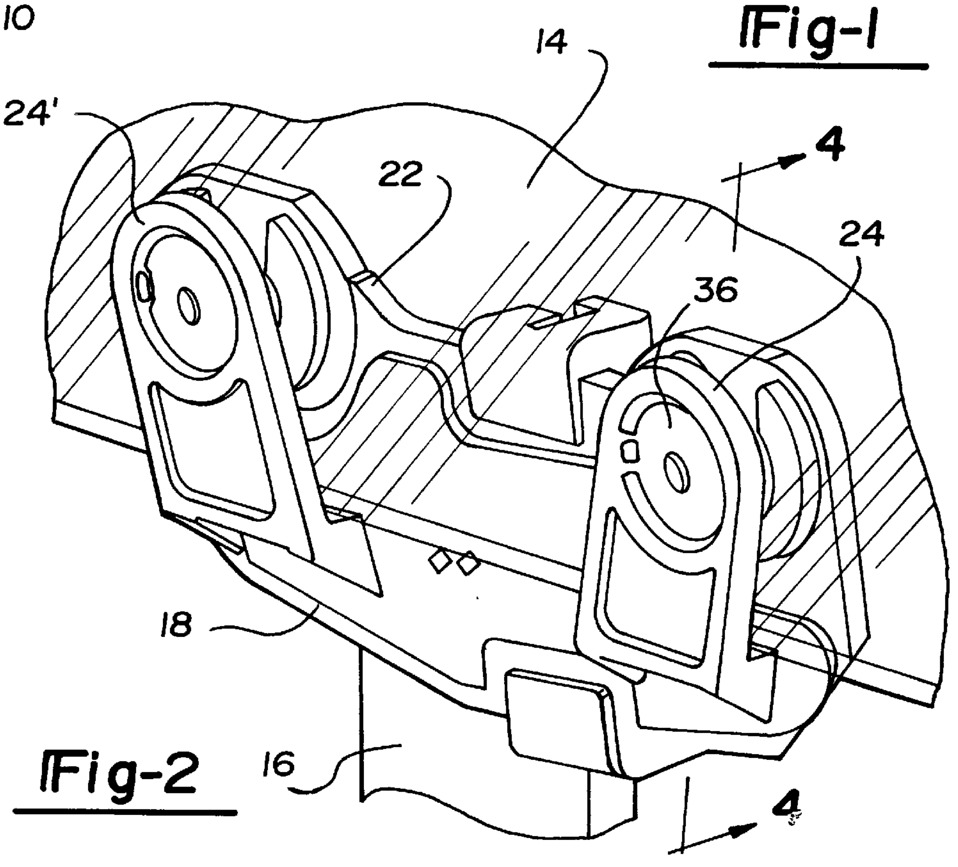
FIG. 2 is a perspective elevational view of the liftplate of the present invention.
Figure 3:
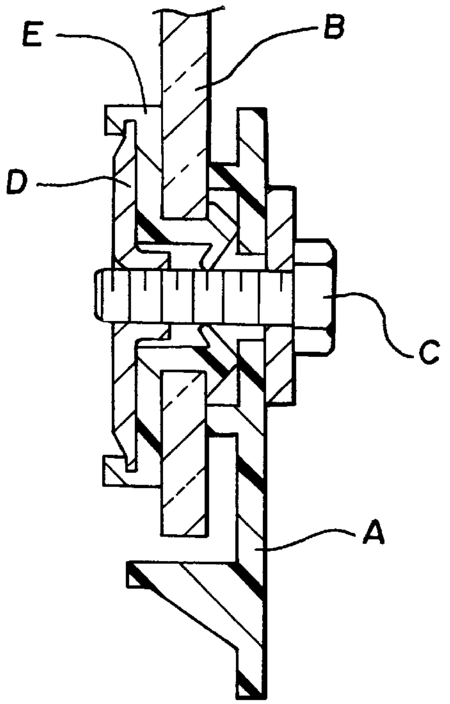
Fig-3 PRIOR ART
FIG. 3 illustrates a prior art liftplate device.
Figure 4:
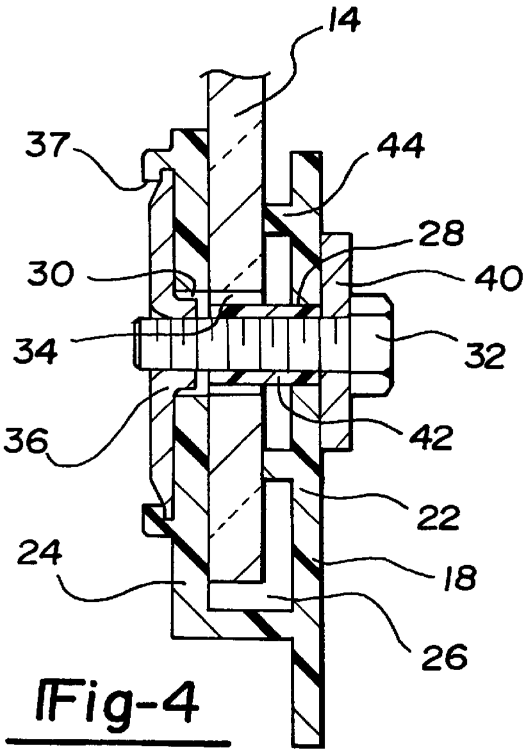
FIG. 4 is a sectional view taken on the line 4—4 of FIG. 2.
Figure 4A:
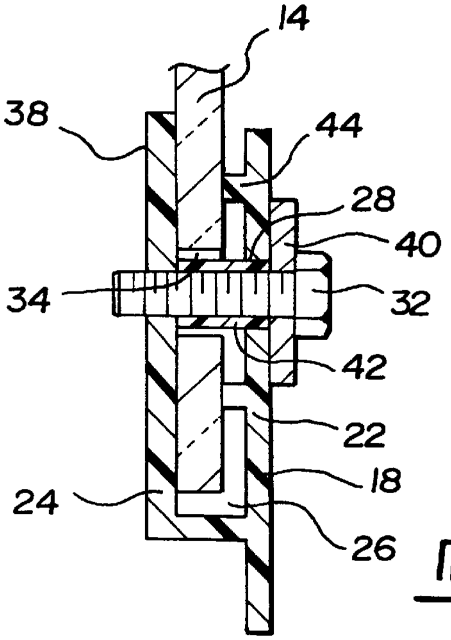
FIG. 4A is a sectional view of an alternate embodiment taken on the line 4—4 of FIG. 2.
Figure 5:
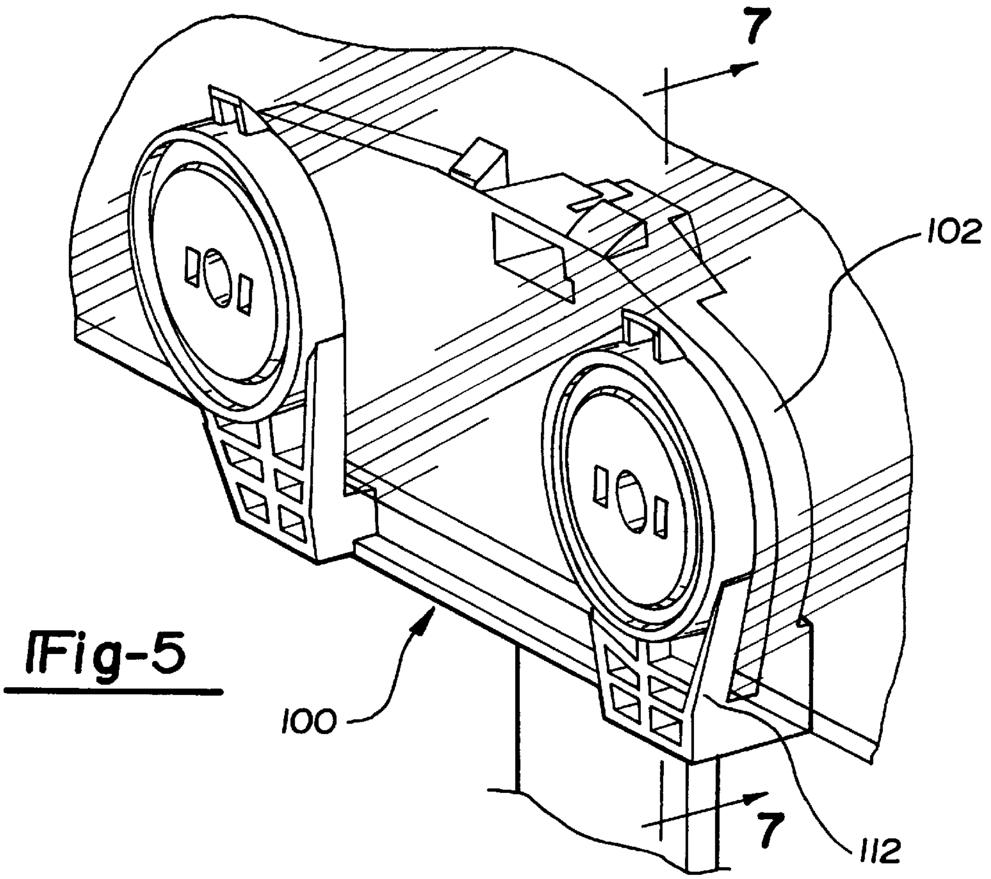
FIG. 5 is a perspective elevational view of another liftplate of the present invention.
Figure 6:
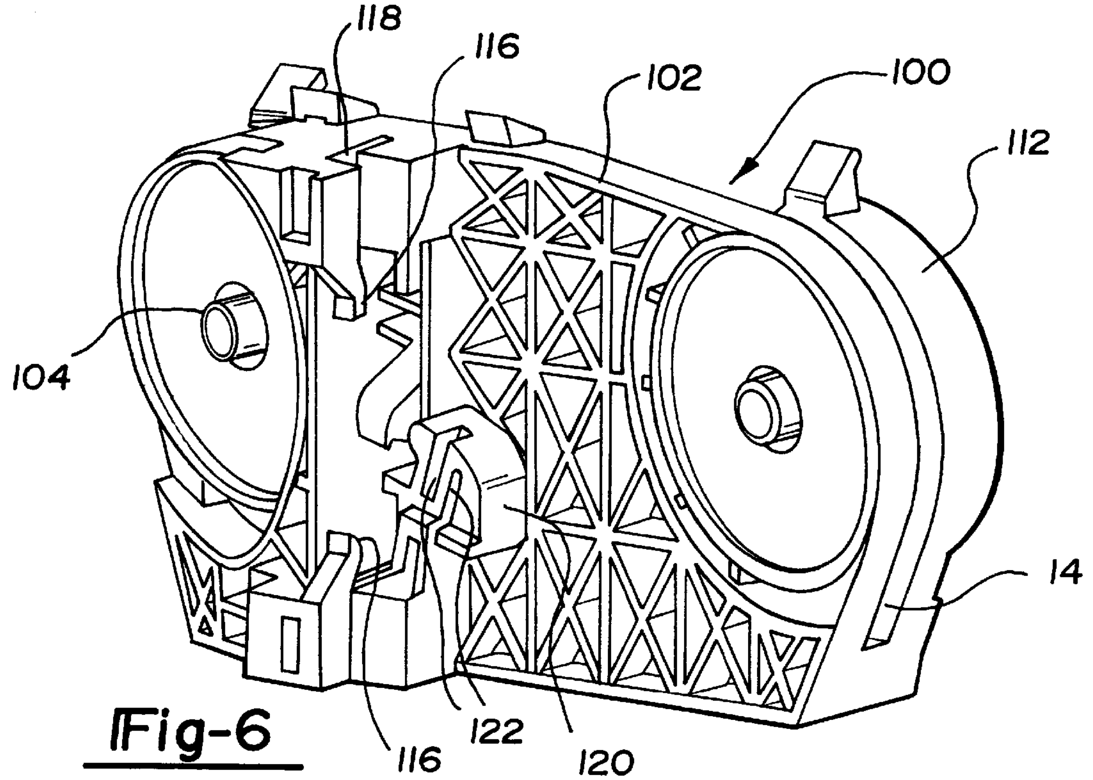
FIG. 6 is another perspective elevational view of the liftplate of FIG. 5.
Figure 7A:
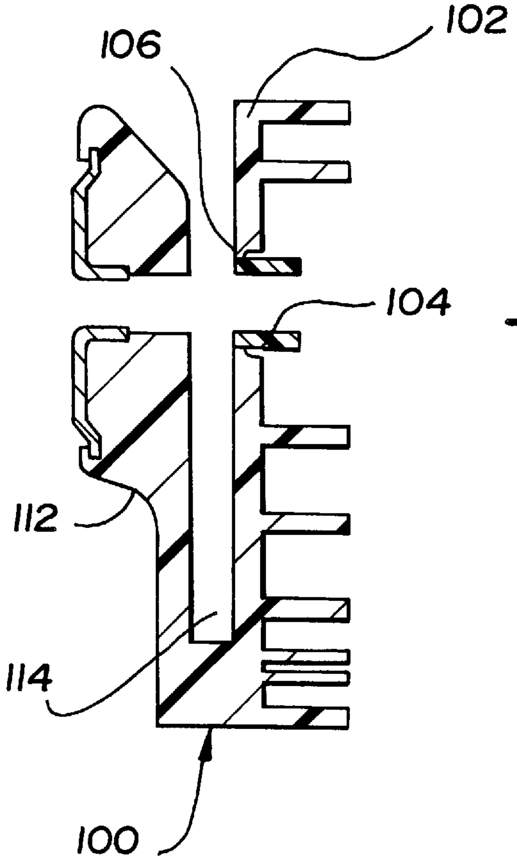
FIG. 7A is a sectional view of an alternate embodiment taken on the line 7—7 of FIG. 5.

Referring to FIG. 2, the liftplate 18 has a first plate member 22 and at least one second plate member 24 (FIG. 2 shows two second plate members 24 and 24'). The first and second plate members are spaced opposite one another and generally parallel to each other. The first and second plate member 22 and 24 are joined together to define a groove 26 (shown in FIG. 4) for receiving a glass sheet 14. The regulator rail 16 is secured to the first plate member 22 in a suitable manner (FIG. 6 illustrates an example of a structure in a liftplate for mounting to a regulator rail). The first plate member 22 and the second plate members 24 and 24' have defined therein, and generally opposite one another, apertures respectively denoted in FIG. 4 by numerals 28 and 30, for receiving a suitable fastener 32, such as a screw. The fastener passes through these apertures and a corresponding aperture 34 in the glass and attaches the plate members and glass to sandwich the glass 14 in place. The fastener can be maintained in place by a retention nut or T-nut 36 (see FIG. 4) or solid plastic plate members 24 and 24' (see FIG. 4*a*). The retention nut 36 can be secured to the second plate member by a flange 37.

A washer 40 may also be disposed between the fastener 32 and an outer wall of the first plate member 22. Shown in FIG. 4, there is also included an insulator 42 surrounding the fastener 32 (e.g., an insulated screw may be used). The liftplate may also include one or more stabilizing ribs 44 for limiting lateral movement of the window sheet glass.

Any suitable window regulator may be employed. An example, without limitation, of one window regulator is described in U.S. Pat. No. 4,970,827 (Djordjevic), incorporated by reference.

The liftplate may be molded from a suitable plastic (e.g., an acetal, such as that commercially available under the name Delrin™ from DuPont Corporation) or may combine an assembly of metal (e.g., steel) and plastic combinations. For example, the retention nuts may be a suitable metal (e.g., steel).

Figure 8:
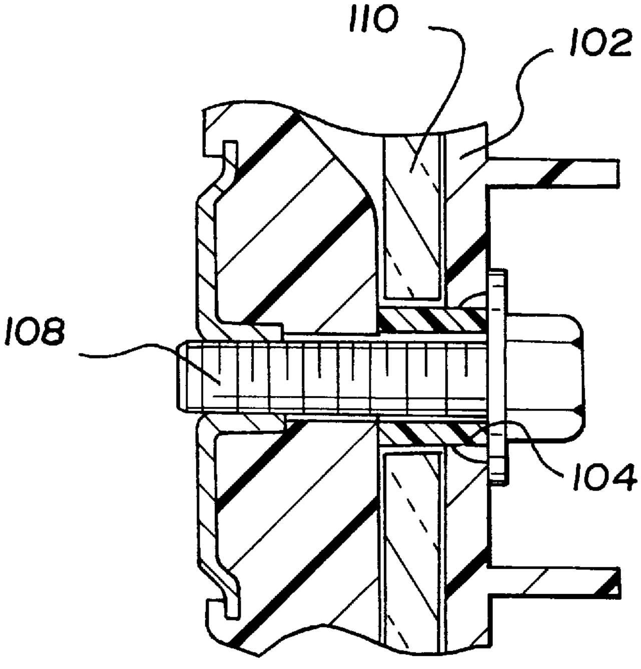
FIG. 8 is an enlarged sectional view as in FIG. 7 showing an insulator in a broken away position with a fastener.

Another embodiment of the present invention is depicted in FIGS. 5–8. This embodiment illustrates an example of a different liftplate configuration than as shown in FIG. 2, though the relative structure and operation is generally the same as between the embodiments. The embodiment of FIGS. 5–8 depicts (as more particularly shown in FIGS. 7, 7*a,* and 8) a breakaway insulating sleeve configuration. Specifically, liftplate 100 has a first plate member 102 with an insulating sleeve 104 molded therein. A tab 106, having a relatively thin section thickness compared with adjacent structure, is molded adjacent the sleeve to allow the sleeve to break away from the first plate member when a fastener 108 is driven through the sleeve upon securing a sheet of glass 110 into place. FIG. 8 illustrates the sleeve 104 in its broken away condition. An opposing and spaced apart second plate member 112 is attached to the first plate member to define a groove 114.

FIG. 6 shows an example of suitable structure for attaching a liftplate, such as the liftplate 100, to a mounting rail.

The first plate member 102 includes inwardly directed projections 116 and adjacent structure having a slot 118 defined therein to receive in generally complementary mating relationship (e.g., tongue-in-groove) a mounting bracket (not shown) associated with the mounting rail (also not shown). A nipple 120 has a plurality of slots 122 defined therein. The slots are undercut to attachably receive an end of a cable (not shown) from the cable assembly as is known in the art.

Reasonable modifications and variations of the above-described illustrative embodiment of the invention are possible without departing from the spirit and scope of the invention, which is defined in the appended claims.

We claim:

1. A liftplate for use in a window mounting assembly, comprising:

a first plate member having two spaced apart apertures defined therein, said first plate member being securable to a window regulator, said apertures in said first plate member each having a sleeve molded therein, each said sleeve attached to said first plate member through a frangible connection which is broken upon insertion of a fastener in an associated one of said apertures of said first plate member;

a second plate member having an upper edge and a lower edge and an aperture defined in said second plate member; and a third plate member having an upper edge and a lower edge and an aperture defined in said third plate member;

said second and third plate members being disposed opposite said first plate member and being joined to said first plate member to define a channel for receiving a sheet of window glass.

2. A liftplate according to claim 1, wherein said second and third plate members each include a retention nut for receiving said fastener.

3. A liftplate according to claim 2, wherein each one of said retention nuts is mechanically locked onto a respective one of said second and third plate members.

4. A liftplate according to claim 1, wherein said second plate member and said third plate member are connected to said first plate member to form a unitary structure.

5. A liftplate according to claim 1, wherein said first, second and third plate members are molded from plastic.

6. A vehicle door assembly, comprising:

a) a vehicle door having an inner panel and upper window opening;

b) a liftplate having a first member and a second member connected together to define a groove therebetween which receives an end portion of a sheet of window glass, each of said first member and said second member having an aperture defined therein, said apertures being in generally concentric opposing relation to one another;

c) said end portion includes an aperture defined therein, said sheet of window glass disposed in said groove so that said aperture of said window glass is generally concentrically aligned with said apertures of said first member and said second member;

d) a fastener received in said aperture of said first member, said second member and said sheet of window glass to secure said sheet of window glass in said liftplate;

e) an actuator drivingly connected to said liftplate for raising and lowering said sheet of window glass in said upper window opening; and f) a tubular insulator molded in said aperture said first member and breaking away from said first member upon insertion therethrough of said fastener.

7. A vehicle door assembly according to claim 6, further comprising a regulator rail connected to said first member of said liftplate.

8. A vehicle door assembly according to claim 7, wherein said first member of said liftplate has an inner wall in opposing relation to said second member, said inner wall having a plurality of ribs projecting therefrom for contacting said sheet of window glass and restricting lateral motion of said sheet of window glass with respect to said lift plate.

9. A vehicle door assembly according to claim 7, wherein said actuator includes an electric motor.

10. A window mounting assembly comprising:

a vehicle window;

a liftplate having a first plate member and a second plate member;

said first and second plate members securing a portion of the vehicle window therebetween;

a first aperture defined in said first plate member;

a sleeve integrally molded to said first aperture of said first plate member, said sleeve being broken away from said first plate member upon insertion of a fastener into said first aperture; and a second aperture defined in said second plate member receiving an end portion of said fastener.

11. A window mounting assembly according to claim 10, further comprising a regulator rail secured to at least one of said first and second plate members.

12. A window mounting assembly according to claim 11, wherein said fastener is threaded and at least one of said first and second apertures is threaded to threadably receive said fastener.

13. A window mounting assembly according to claim 10, wherein the vehicle window has an aperture defined in a lower end thereof, and said fastener passes through the aperture of thew vehicle window.

14. A window mounting assembly according to claim 10, wherein said first plate member has an inner wall in opposing relation to said second plate member and has at least one rib projecting from said inner wall to stabilize said vehicle window with respect to said liftplate.

* * * * *